United States Patent Office 3,411,343
Patented Nov. 19, 1968

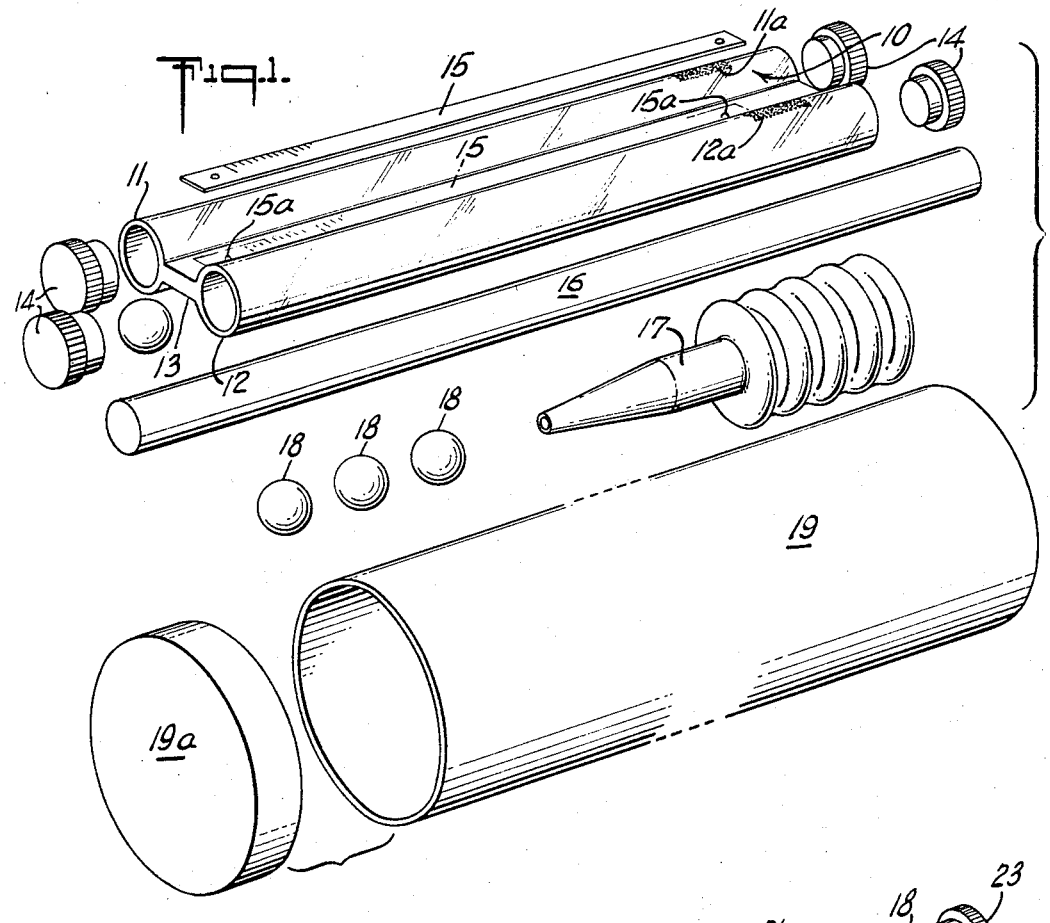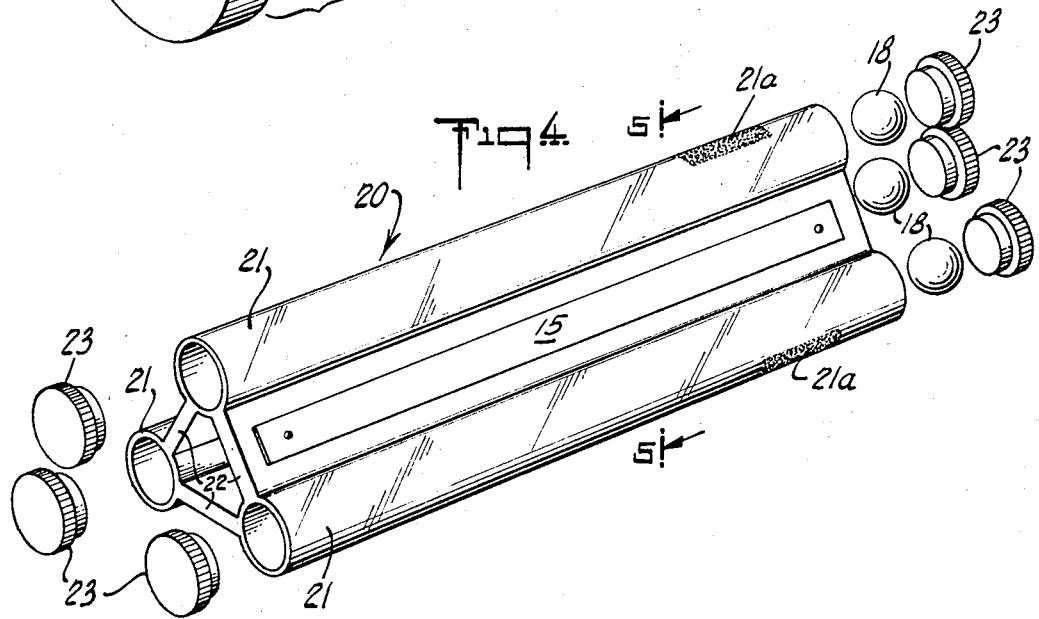

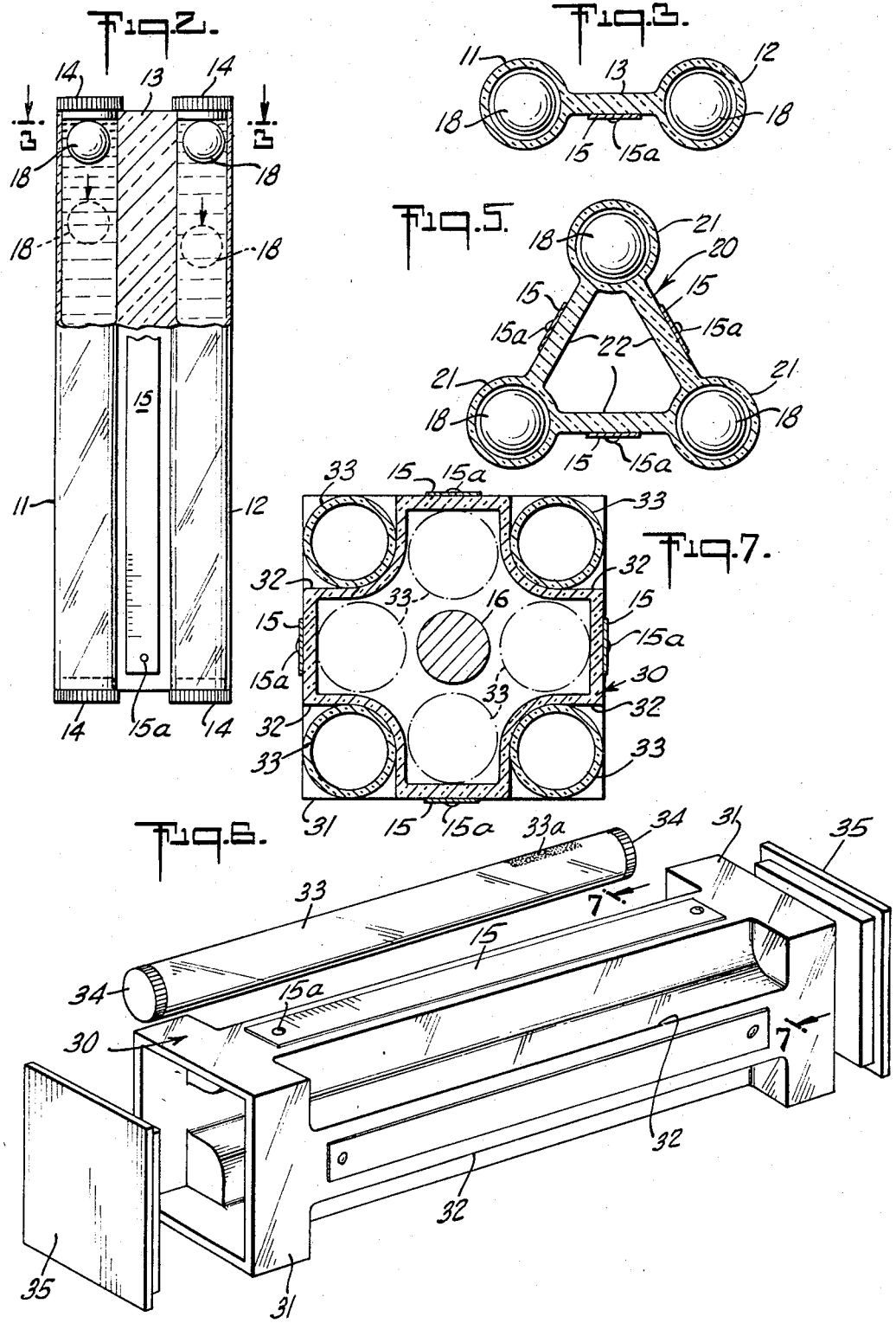

3,411,343
VISCOSITY TEST KIT
Roger P. Baird, Jr., Richmond, Va., assignor to Texaco Inc., New York, N.Y., a corporation of Delaware
Filed Oct. 23, 1965, Ser. No. 503,552
11 Claims. (Cl. 73—57)

ABSTRACT OF THE DISCLOSURE

A pocket-size, do-it-yourself assembly kit for measuring and demonstrating viscosity comprising at least a pair of cylindrical members with end closures and a supporting web for holding a test scale, test members for insertion into said cylindrical members, means for providing test samples to the same and a container with closure for housing the elements of the kit.

---

This invention relates generally to a viscosity test instrument, and more specifically to a self-assembly, portable test kit for use as a viscosity measuring instrument.

Viscosity test instruments utilizing falling balls in a pair of parallel, spaced transparent tubes with a suitably disposed scale, by which the viscosity of the fluid in the tubes may be measured, are known in the art. Such devices are versatile in application for the testing of various fluids simple to operate, and provide a reasonably fast check on the viscosity of the fluids under test.

With the falling ball type of viscosity test instrument, it is possible to test the viscosity of different fluids, e.g. lubricating oils, by use of different scales under the known conditions for the testing, e.g. comparing a sample of a fluid having an unknown viscosity with a fluid, such as lubricating oil, of known viscosity.

An object of the present invention is to provide a novel test instrument of this type to test fluid, e.g. lubricating oil, for changes in viscosity from its original condition by comparing a sample of used fluid with a sample from the original supply of fluid.

Another object of the present invention is to provide a pocket-size, do-it-yourself assembly kit for measuring and demonstrating viscosity, which is inexpensive enough so as to be readily disposable, yet strong enough in construction to be of permanent value.

Still another object of the invention is to provide a falling ball type of viscosity test kit with a pleasing design for use as a promotion sales item, which is capable of extensive use under a plurality of test conditions.

These and other objects, features and advantages of the present invention will become apparent from the following description and claims of the present invention, by reference to the accompanying drawings wherein:

FIG. 1 is an exploded perspective view of the several items or elements of the self-assembly test kit;

FIG. 2 is an elevation, partly in section, showing a double, sample tube test kit in use;

FIG. 3 is a cross section taken along the line of 3—3 of FIG. 2.

FIG. 4 is an exploded perspective view of another embodiment of the invention, showing a unitary structure of a trio of sample tubes;

FIG. 5 is a cross section taken along the line of 5—5 of FIG. 4;

FIG. 6 is an exploded perspective view of another embodiment of the invention, showing a holder with square ends, the intermediate structure having the shape of a Greek cross in cross section, for holding four sample tubes; and FIG. 7 is a cross section taken along the line of 7—7 of FIG. 6.

In accordance with the illustrated embodiments of my invention, there are shown structures which are pleasing in appearance, relatively inexpensive to construct, capable of withstanding considerable abuse and yet provide for accurate test results.

Referring to FIG. 1, the basic embodiment of the invention is disclosed generally at 10, comprising a pair of transparent plastic sample tubes 11 and 12, interconnected and held in parallel, spaced relationship by web or ribbing 13, these elements being made as a unit. Each of the tubes has a knurled area, 11a and 12a, for receiving identification marks. Closures, such as friction held caps 14, are provided for each end of the tubes. The graduated scale 15 is shaped for attachment to the web or ribbing 13 between the tubes 11 and 12, by positioning in grooves (not shown) or by being held by pins 15a. The kit also includes a solid, plasitc plunger rod 16, of a size to provide a close fit within the tubes 11 and 12, for use in drawing into these tubes the fluids to be tested. Also provided is a syringe type plastic bellows 17 for the insertion of sample fluids for testing into the tubes 11 and 12, when its use would be more convenient than that of the plunger rod 16. Non-buoyant balls, 18, e.g. metallic spheres, slightly smaller than the inside diameter of the tubes 11 and 12, are furnished, too, and the entire kit of the aforementioned items is stored and/or shipped in a plastic cylindrical container or case 19, fitted with an end cap or closure 19a.

FIG. 2 shows the action of the metallic spheres during a test, with the fluid in sample tube 12 having a lower viscosity than the fluid in sample tube 11.

Referring to FIGS. 4 and 5, there is disclosed the three-tube embodiment 20, comprising three sample tubes 21 interconnected and held in parallel spaced relationship by webs or ribbing 22. Approximate scales 14 are supported by the ribbing 22 in the same manner as in FIG. 1, with the closures for the three tubes shown at 23. Non-buoyant, test members 18 are provided as needed. As in the embodiment disclosed in FIG. 1, each of the tubes has a knurled area, as shown in FIG. 4 at 21a, for receiving identification marks. The kit as shown in FIG. 4 also may be stored and/or shipped in a cylindrical container or case such as 19, FIG. 1.

FIGS. 6 and 7 disclose the four tube embodiments of the test kit with the storage and shipping container at 30. Each end 31 is square in cross section, with the intermediate structure having a cross section in the shape of an equal arm or Greek cross. This is obtained by forming each of the longitudinal edges of a generally square container with a depression or grooved external surface having the configuration of a quarter of a cylinder, as shown at 32, for receiving the sample tubes 33. These sample tubes have closures 34 of such a form that when positioned in the edge depressions 32, are held in place by friction. As in the other embodiments, each of the sample tubes has a knurled area as disclosed at 33a, for identification marks. Scales 15 are attached to the external walls of the container 30 between the edge depressions, with the closures for the container shown at 35.

FIG. 7 shows the four sample tubes in position for test use; and in dotted configurations are the positions of the sample tubes for storage and/or shipping at the outer ends of the arms of the cross section, the middle space being occupied by the solid plastic rod 16, or by the metallic spheres, or the plastic bellows.

Although the sample tubes have been shown as hollow cylindrical pipe members, each tube could have an integral closed end with the other end open for filling, using a device such as the bellows 17. Further, the end closures could be either male or female type; and the scales used are those necessary to determine the viscosity of fluids tested in Saybolt seconds, or according to the Engler, absolute or Redwood methods.

Thus, there has been shown and described a plastic kit for testing viscosity which is easy to assemble, and can be stored and shipped in a readily used container.

Other modifications and variations of the invention, as hereinbefore set forth, may be made without departing from the spirit and scope thereof, and therefore, only such limitations should be imposed as are indicated in the appended claims.

I claim:

1. A portable test kit including a hollow columnar receptacle having closure means therefor, a plurality of sample holding, hollow columnar members with removable closure means for each of the ends of said members, supporting means joining said columnar members together in spaced, parallel relationship to each other, means for providing samples to said plurality of hollow columnar members, test members for insertion into said hollow columnar members, and a scale held on the exterior of said receptacle for use during tests of samples, said hollow columnar receptacle with closure serving as a repository for the remaining elements of said test kit.

2. In the test kit as defined in claim 1, said hollow, columnar receptacle being provided with a grooved external surface for receiving a sample holding, hollow columnar member.

3. In the test kit as defined in claim 1, said columnar receptacle and said columnar members being made of a transparent material.

4. In the test kit as defined in claim 3, said transparent material being plastic, said hollow columnar receptacle having a quadrilateral configuration with grooved external surfaces along the longitudinal edges thereof for receiving said columnar members, said sample holding, hollow columnar members being cylindrical.

5. In the kit as defined in claim 1, the sample providing means comprising a syringe type bellows member.

6. In the kit as defined in claim 1, the sample providing means comprising a cylindrical element having a close fit within said columnar members for use as a pump plunger therein.

7. In the kit as defined in claim 1, said columnar members comprising a unitary structure of a pair of parallel transparent cylinders interconnected and held in spaced relationship by a web.

8. In the kit as defined in claim 1, said columnar members comprising a trio of parallel, equidistantly from spaced transparent cylinders joined together by interconnecting webs.

9. A kit for testing viscosity comprising a trio of hollow cylindrical members for holding test samples with closures for each of the ends thereof and means interconnecting and supporting said members, in spaced parallel relationship to and equidistantly from each other, a scale for measuring viscosity positioned on the interconnecting means between separate pairs of said cylindrical members, test members for insertion into said cylindrical members, means for providing test samples to said cylindrical members, and a container with a closure for housing the aforementioned elements comprising the kit.

10. A kit for testing viscosity including a quadrilateral shaped container with external grooves along the longitudinal edges thereof and having closure means, a plurality of sample retaining members for positioning in said external grooves, said last mentioned members including test members positioned therein and end closures for all the ends thereof, scale means supported by said container between said grooves, and means for providing said sample retaining members with test samples, said container housing the remaining aforementioned elements of said kit.

11. In the kit as defined in claim 10, the sample providing means comprising a plastic bellows syringe, said container and sample retaining members consisting of a transparent plastic material.

References Cited

UNITED STATES PATENTS

| | | | |
|---|---|---|---|
| 1,427,922 | 9/1922 | Tiffany | 73—57 |
| 1,511,998 | 10/1924 | Larson et al. | 73—57 |
| 1,600,250 | 9/1926 | Sartakoff | 73—57 |
| 2,086,771 | 7/1937 | Jester | 73—57 |
| 2,493,922 | 1/1950 | Miller. | |

FOREIGN PATENTS 138,190   8/1950   Australia.

S. CLEMENT SWISHER, *Primary Examiner.*

J. W. ROSKOS, *Assistant Examiner.*